Patented June 21, 1938

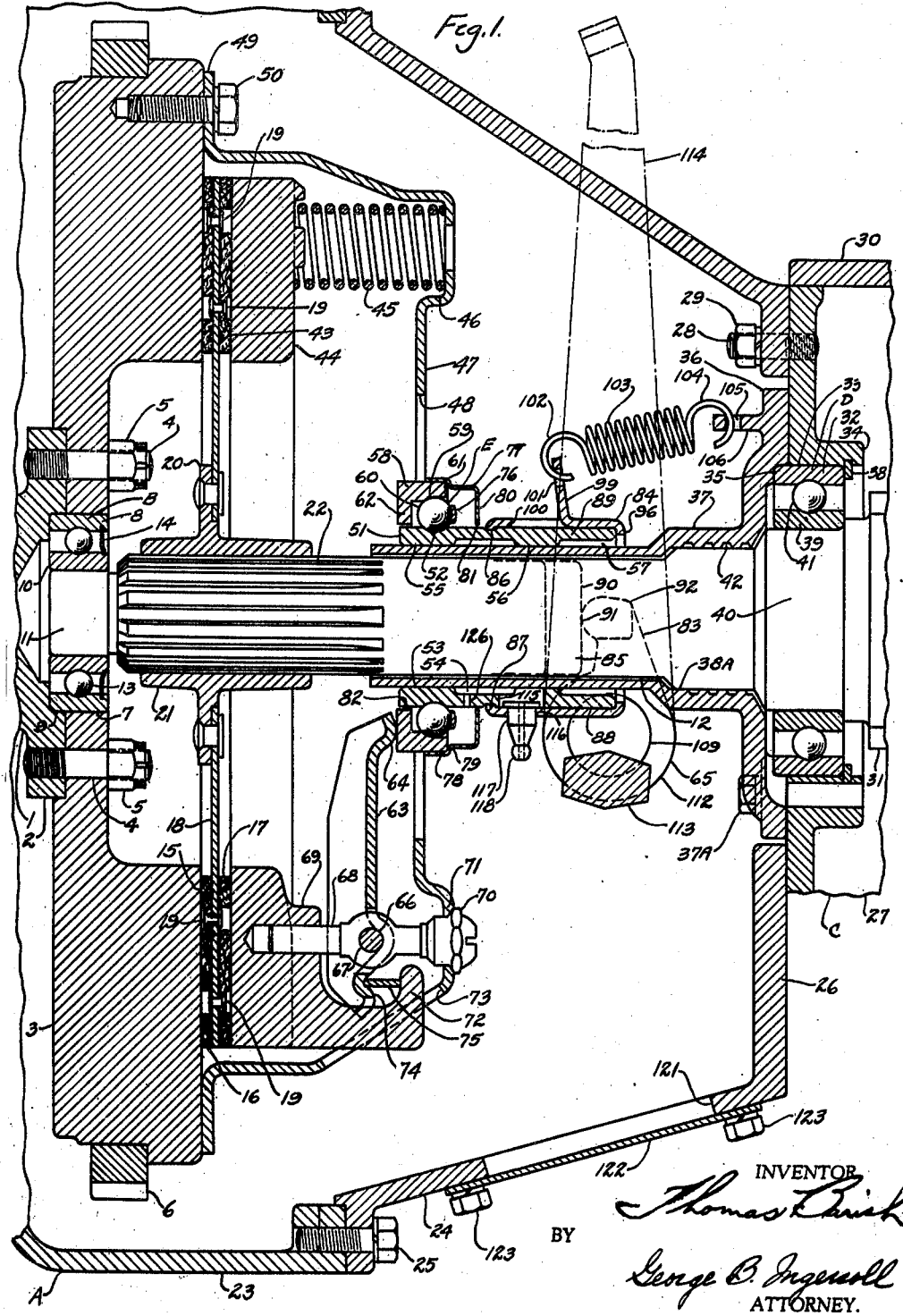

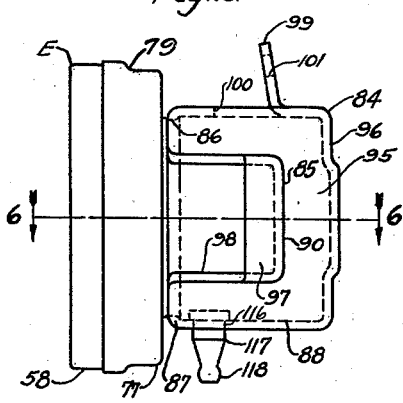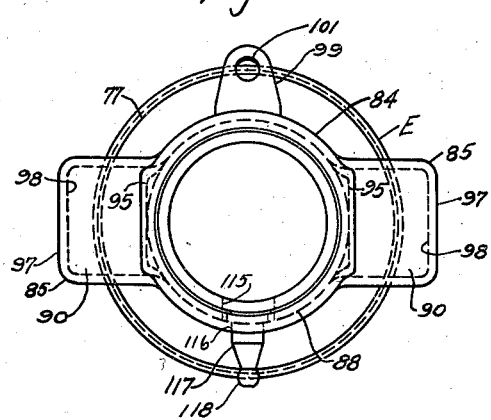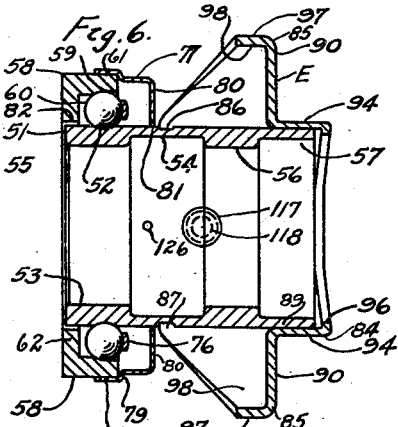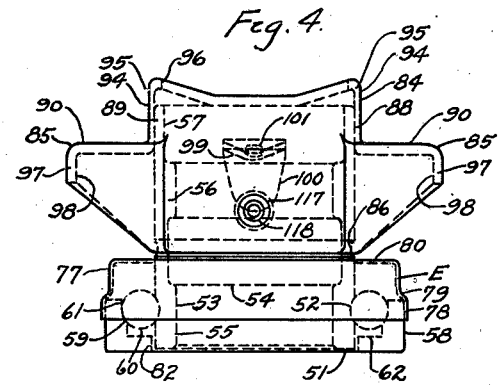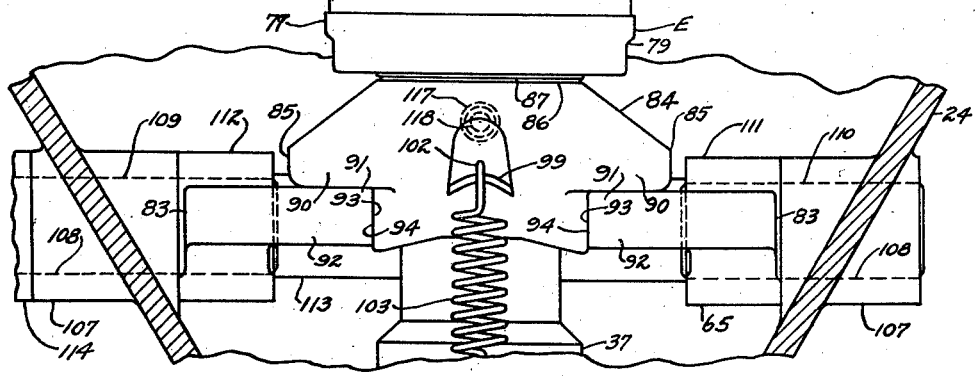

2,121,418

UNITED STATES PATENT OFFICE 2,121,418

CLUTCH BEARING MECHANISM

Thomas Barish, Jamestown, N. Y., assignor to Marlin-Rockwell Corporation, Jamestown, N. Y., a corporation Application December 13, 1935, Serial No. 54,208

15 Claims. (Cl. 192—110)

My invention relates to improvements in a bearing mechanism for use in the throwout mechanism of a clutch mechanism for use in automotive vehicles or similar units, and the objects of my invention are, first, to provide a bearing mechanism having an inner race member slidably mounted; second, to provide a bearing mechanism adapted to support a housing member adapted to receive thrust loads from a clutch throwout mechanism; third, to provide a bearing mechanism having a sleeve member movably mounted and provided with a raceway for the bearing mechanism; fourth, to provide a bearing mechanism having an extended race member adapted to support a housing for engagement with a clutch throwout mechanism; fifth, to provide a bearing mechanism adapted to support a housing member constructed from sheet material and adapted for engagement with a clutch throwout mechanism; sixth, to provide a member for use in a clutch throwout mechanism and constructed from sheet material and having portions of its walls displaced to form boss portions for engaging a clutch throwout mechanism; seventh, to provide a member for use in a clutch throwout mechanism, having a retractive member, and constructed from sheet material and having a portion of its wall displaced to form a lug or boss for connecting with the retractive member; eighth, to provide a bearing mechanism having a lubricant chamber connected with a lubricant connection supported by the bearing mechanism; ninth, to provide a bearing mechanism for use with clutch throwout mechanisms and having a relatively smaller diameter than that of bearing mechanisms conventionally used heretofore; tenth, to provide a new method of making a combined bearing and thrust receiving throwout member for use in clutch throwout mechanisms; eleventh, to provide a clutch throwout mechanism having a thrust receiving member constructed of sheet steel or similar material and adapted to be treated to obtain hardness characteristics to obtain longer life in its operation of engaging a thrust member of the clutch throwout mechanism; twelfth, to provide a bearing and thrust receiving mechanism, for use in a clutch throwout mechanism, that can be more economically manufactured than the conventional bearing and thrust receiving mechanism used heretofore.

I attain these objects by the mechanism illustrated in the accompanying drawings, in which—

Figure 1 is a vertical section of a clutch mechanism incorporating my clutch bearing mechanism, said clutch mechanism being disclosed in association with portions of an internal combustion engine together with portions of a transmission mechanism; Fig. 2, a side view of the clutch bearing mechanism; Fig. 3, an end view of the clutch bearing mechanism disclosed in Fig. 2; Fig. 4, a plan view of the clutch bearing mechanism disclosed in Figs. 2 and 3; Fig. 5, a partial plan view of the clutch bearing mechanism disclosed in association with portions of the clutch mechanism disclosed in Fig. 1; and Fig. 6, a sectional view of the clutch bearing mechanism taken on the line 6—6, Fig. 2.

Figure 1 discloses my clutch bearing mechanism disclosed in association with the clutch mechanism used with an internal combustion engine of an automotive vehicle together with the transmission mechanism with which the automotive vehicle is equipped, portions only of the internal combustion engine and the transmission mechanism being disclosed, said portions of said internal combustion engine and said transmission mechanism being sufficient to disclose the way in which my clutch bearing mechanism is installed and operated therewith.

The crank shaft 1 of the internal combustion engine assembly F is provided with the flange 2 to which the flywheel 3 is suitably secured as by means of the studs 4 and nuts 5, the flywheel 3 being disclosed as being provided with a starter gear 6.

The flywheel 3 is provided with the bore 7 in which is mounted the bearing assembly A, the outer race 8 of the bearing assembly A being mounted in the bore 7 and in the recess 9 of the flange 2 of the crank shaft 1.

The bearing assembly B is provided with the inner race member 10 which is adapted to engage with and support the journal portion or cylindrical surface 11 of the clutch shaft 12 which also constitutes the main shaft of the transmission mechanism or assembly C.

The bearing assembly B is provided with a plurality of ball members 13 rollably assembled between the outer race 8 and the inner race 10, the bearing assembly A being suitably provided with a lubricant retaining member 14.

The flywheel 3 is provided with the frictional surface 15 which is adapted to engage the friction facing or lining 16, which, together with the friction facing or lining 17, is secured to the disc 18 by a plurality of rivets 19.

The disc 18 is secured to the flange 20 which forms a portion of the hub 21 which is provided with splines extending therethrough for slidably engaging the splines 22 of the clutch shaft 12.

The internal combustion engine assembly F is provided with the flywheel housing 23 which encloses the flywheel 3 and supports the clutch housing 24 which is secured thereto by a plurality of screws 25.

The clutch housing 24 is provided with the end wall portion 26 to which is secured the transmission case or housing 27 which is suitably secured to the wall portion 26 by the studs 28 and nuts 29.

The transmission case 27 is provided with the cover 30 and is adapted to enclose the gear mechanism of the transmission assembly C, one of the gears being partially disclosed at 31 and being integrally connected with the clutch shaft 12 and forming the main drive gear for the transmission assembly C.

The clutch shaft 12 is supported in the bearing assembly D which is provided with the outer race member 32 which is assembled in the bore 33 of the boss portion 34 of the transmission housing 27, the outer race member 32 extending within the recess 35 of the retainer housing 36 which is secured to a front wall portion of the transmission housing 27 by a plurality of screws 37A, the outer race member 32 being further retained by the snap ring 38 which is suitably mounted in a groove in the boss portion 34 of the transmission housing 27.

The inner race member 39 of the bearing assembly D engages with the journal or shoulder portion or diameter 40 of the clutch shaft 12, thus supporting the rear end portion of the clutch shaft 12 in its operation by means of the balls 41 rollably mounted between the inner race member 39 and the outer race member 32 of the bearing assembly D. The retainer housing 36 is provided with the extension portion 37 which is provided with a bore 38A extending therethrough and provided with a helical thread or groove 42 which tends to prevent lubricant from escaping therethrough between the bore 38A and the outer diameter of the clutch shaft 12 from the recess 35 and transmission housing 27, the extension portion 37 being extended to provide a journal for the sleeve 51.

The friction facing 17 is adapted to be engaged by the frictional surface 43 of the clutch plate or disc 44 which is continually urged toward the friction facing 17 so that the frictional surface 43 of the clutch or thrust plate 44 will tend to always engage the friction facing 17, this continual engagement being developed by a plurality of resilient members 45 which are suitably retained in engagement with the clutch plate 44 and extend within recesses 46 formed in the clutch cover 47, the clutch cover 47 being provided with the bore or opening 48 surrounding the clutch shaft 12, the clutch cover 47 being provided with the flange portion 49 which is secured to the flywheel 3 by a plurality of screws 50, thus furnishing an anchorage or reaction absorbing member for retaining the resilient members 45 in their operative positions.

It is to be noted that the above description of the operative parts of my clutch transmission engine is herewith provided to sufficiently disclose how my clutch bearing mechanism is associated and operated therewith.

It is also to be noted that clutch throwout mechanisms conventionally used for accomplishing engagement and disengagement of the operating parts of a clutch mechanism are conventionally provided with a sleeve member or housing constructed of a cast material such as cast iron for supporting a clutch throwout bearing assembly, said conventional sleeve member being mounted directly on an extension portion of a housing similar to the retainer housing 36 disclosed herein.

Also it is to be noted that a conventional sleeve member, as above described and constructed of cast material, conventionally incorporates a forked structure for engagement with a clutch throwout yoke.

In my invention I eliminate said conventional sleeve construction of cast material and substitute the sleeve 51 which can be constructed from bar stock or as a forging and of suitable material which will permit the sleeve 51 to be provided with the groove or raceway 52 extending circumferentially therearound instead of utilizing a separate inner race member mounted upon said conventional sleeve made of cast material, the sleeve 51 thus being utilized in my invention as the inner race member of the clutch throwout bearing assembly E, thus not only permitting greater economy in manufacturing costs but also permitting, by the utilization of the sleeve 51 as the inner race member of the clutch throwout bearing assembly E, a much smaller size of clutch throwout bearing assembly as the sizes or diameters of said clutch throwout bearing assemblies are dictated by the size of the clutch shafts together with the sleeves and extensions used thereon, and inasmuch as it is inadvisable to reduce the size of the clutch shaft, such as 12, below a minimum size, due to the necessity of providing it with a spline such as 22 for engaging and forming a driving connection with the hub 21 of the disc 18, and which thus provides a driving mechanism for the clutch, the reductions in the sizes and diameters of the clutch throwout bearing assembly E, as used in my invention, automatically achieves a great saving and economy in cost, installation and servicing of my clutch throwout bearing assembly for the operation of the clutch assembly.

The sleeve 51 is provided with the bore 53 extending therethrough and adapted to slidably engage and operate on the outside diameter or journal portion of the forward end of the extension portion 37, the bore 53 being provided with the clearance space 54 between the lands or portions 55 and 56 of the bore 53, said lands 55 and 56 thus providing the bearing surfaces for slidably supporting the sleeve 51 on the extension portion 37, the clearance space 54 providing a space for containing lubricant between the land portions 55 and 56.

Also the sleeve 51 may be provided with the clearance space or diameter 57 at its rear end.

The clutch throwout bearing assembly E is provided with the outer race member 58 which in turn is provided with the raceway 59 which is adapted to engage a plurality of balls or rollably mounted members 60 operatively mounted between and engaging the raceway 52 of the sleeve 51 and the raceway 59 of the outer race member 58, the raceway 59 being formed with the open side 61 to permit the assembly of the balls or equivalent rollably mounted members 60 within the outer race member 58, and at the same time to allow the other side of the raceway 59 to engage the balls 60 so that a thrust load may be absorbed by the clutch throwout bearing assembly E when said thrust load is applied against the flange portion 62 of the outer race member 58 from a plurality of lever members 63 which are each provided with curved end portions 64 for engaging the flange portion 62 of the outer race member 58, the clutch throwout assembly E being further adapted to absorb thrust loads when applied longitudinally of the sleeve member 51 by means of the clutch throwout yoke 65 as hereinafter more fully described.

It is to be noted that the lever members 63 are each provided with the curved portions 66 which pivotally engage and are supported upon a plurality of pins 67 each supported on a screw member 68 which slidably engages a boss structure 69 of the clutch plate 44, the screw member 68 being provided with the head portion 70 which engages a bearing surface of the boss portion 71 of the clutch cover 47, the boss portions 69 being provided with extension portions 72 which extend through and engage the sides of a plurality of openings 73 in the clutch cover 47 to provide means for driving the clutch plate 44.

Also the lever members 63 will each be provided with an extension portion 74 for extending between the main portion of the boss 69 and the extension portion 72 and adapted for engagement with the member 75 which extends between the lever member 63 and the flange 72 and for exerting a thrust from the resilient members 45 through its curved portion 64 against the front surface of the flange 62 of the outer race member 58.

The clutch throwout bearing assembly E is provided with a conventional cage structure 76 which encloses the balls 60 and retains them in spaced positions around or circumferentially of the raceways 52 and 59. Also the clutch throwout bearing assembly E is provided with the housing 77 which is provided with the bore 78 which closely fits over and around the outside diameter of the outer race member 58 to position and retain the housing 77 in its operating position, the housing 77 being provided with the shoulder 79 which is adapted to engage the rear surface of the outer race member 58 and thus position the housing 77 longitudinally thereon, the housing 77 being further provided with the rear wall portion 80 which extends substantially at right angles to the axis of the sleeve 51 and has a bore or opening 81 therethrough of slightly larger diameter than the outside diameter of the sleeve 51 to permit the housing 77, together with the outer race member 58, to revolve relative to the sleeve member 51, the position of the bore 81 relative to the outer diameter of the sleeve 51 being sufficiently close as to retain lubrication within the clutch throwout bearing assembly E.

Also the flange portion 62 of the outer race member 58 is provided with the bore 82 which is located relatively close to the outside diameter of the sleeve 51 to retain lubricant within the clutch throwout bearing assembly E, and at the same time to allow rotation of the outer race member 58 relative to the sleeve 51.

It is also to be now especially noted that whereas a conventional sleeve of cast material as above described, is provided in conventional clutch assemblies, to provide forked or shoulder portions for engagement with the lever or forked portions 83 of the clutch throwout yoke 65, my invention utilizes a housing 84 which not only provides a less expensive construction because of its adaptability to be formed as a housing member from strip or sheet steel or similar material of relatively thin section, but also provides a much more durable construction due to the adaptability of the housing 84 together with its boss portions 85 to be heat treated, as by case hardening or cyaniding or similar operations, to invest its wear surfaces with hardness characteristics for engaging the lever portions 83 of the clutch throwout yoke 65.

Figs. 2, 3 and 4 disclose the housing 84 mounted on the sleeve 51 in conjunction with the clutch throwout bearing assembly E and removed from the remainder of the clutch and transmission mechanism.

The sleeve 51 is provided with the relatively shallow groove or undercut portion 86 extending circumferentially around the sleeve member 51 and adapted to receive the flange portion 87 of the housing 84, the housing 84 being provided with the chamber or bore 88 which is adapted to engage and fit closely with the outside diameter of the extension portion 89 of the sleeve 51, the extension portion 89 extending rearwardly from the portion of the sleeve 51 which is provided with the raceway 52.

The housing 84 is assembled over the extension portion 89, and then the flange portion 86 is forced as by a spinning operation to tightly engage and extend within the undercut or groove portion 86 to retain the housing 84 in an assembled position on the sleeve 51, the housing 84 being further retained by a press fit between the outer diameter of the extension portion 89 and the bore 88 of the housing 84.

It is to be noted that the housing 84 will have oppositely disposed side portions of its walls formed or displaced outwardly to provide the boss portions 85 extending outwardly from the body portion of the housing 84, the side wall portions of the housing 84 displaced to form the boss portions 85 having the solid wall portions 90, the inner surfaces of which are adapted for engagement with the rounded or cam surfaces 91 of the ends 92 of the throwout fork 65, the inner end surfaces 93 of the end portions 92 of the throwout fork 65 being adapted to engage the flat surfaces 94 of the wall portions 95 which are displaced from the main wall portions of the hub of the housing 84 to provide oppositely disposed wall portions extending substantially at right angles to the axis of the housing 84 for substantially the width of the boss portions 85.

The housing 84 is provided with the flange or abutment portion 96 which extends substantially at right angles to the axis of the housing 84 at the rear end thereof and provides a shouldered portion for engaging and abutting the rear end of the extension portion 89 of the sleeve 51 to further assist in retaining the housing 84 longitudinally in its assembled position on the sleeve 51, the flange portion 96 extending adjacent the outer or rear ends of the wall portions 95 as well as around the remainder of the cylindrical portion of the housing 84, the portions of the flanges 96 extending between the wall portions 95, however, being utilized for engagement with the end surface of the sleeve 51 and for absorbing thrust loads imposed on the boss portions 85 by the ends 92 of the throwout yoke 65, the portions of the flange 96 adjacent ends of the wall portions 95 being displaced to points beyond and in non-engaged positions relative to the end surface of the sleeve 51 to provide for an increased length of the wall portions 95.

It is also to be noted that the boss portions 85 will be formed with the wall portions 97 which extend substantially in parallel planes at the outer ends of the wall portions 90, the wall portions 90 being formed with the hollow chambers 98 therein and which connect with the bore 88 of the housing 84.

It is also to be noted that the housing 84 will have a portion of its cylindrical wall displaced substantially at a point midway between the boss portions 85 at one end of the hub portion of the housing 84 to form the boss or lug 99 which extends outwardly from the hub portion of the housing 84 in a plane forwardly inclined relative to a plane extending at right angles to the axis of the housing 84, the displacement of the wall portion to form the lug 99 providing the opening 100 in the side wall of the hub portion of the housing 84.

The lug portion 99 is provided with the hole or opening 101 therethrough which is adapted to receive the end 102 of the retractive spring or resilient member 103 which is provided with the end 104 which is adapted to extend through and be retained in the hole or opening 105 of the lug 106 which is connected with the retainer housing 36, thus providing means for anchoring one end of the spring 103.

It is to be noted that the housing 24 will be provided with the oppositely disposed boss portions 107 provided with the bores 108 extending therethrough and in which is rotatably mounted the shafts 109 and 110, the shafts 109 and 110 extending within and being suitably secured to the hub portions 111 and 112 of the throwout yoke 65, the boss portions 111 and 112 being joined by the connecting bar or portion 113 to insure both of the hub portions 111 and 112 revolving or turning together when thrust or pressure is applied to the end of the pedal lever or member 114, indicated by dotted lines in Fig. 1, to operate the clutch bearing mechanism to operate the clutch mechanism of the vehicle.

The sleeve 51 is provided with a bore 115 and the housing 84 is provided with the smaller bore 116 extending respectively through each of the side walls thereof, said bores 115 and 116 having their axes extending at right angles to the axis of the clutch shaft 12 and in the bores 115 and 116 are assembled, by a press fit in one of said bores, the lubrication connection or member 117 which is provided with a rounded end 118 which is adapted to receive the end of a conventional grease or oil gun or similar tool which permits grease or oil as a lubricant to be forced through the member 117 and into the chamber or clearance space 54.

The clutch housing 24 is provided with the hole or opening 121 extending through one of its side walls and which is closed by the cover 122 which is secured to the clutch housing 24 by a plurality of screws 123, the opening 121 permitting said conventional grease or oil gun to be inserted therethrough for connection with the rounded end 118 of the member 117.

Also a relatively small hole may be formed in the side wall of the sleeve 51, as at 126, which will provide a passage for lubricant through the sleeve 51 into the interior of the chamber formed between the housing 71 and the inner and outer race members 51 and 58 of the clutch throwout bearing assembly E.

In operation the operator or driver of the vehicle imposes a pressure or thrust load upon the lever member 114 to rotate the shafts 109 and 110, together with the clutch throwout yoke 65, which will cause the curved surfaces 91 of the ends 92 of the lever or forked arms of the clutch throwout yoke 65 to exert a thrust against the surfaces 90 to move the housing 84 together with the sleeve 51 in a forwardly direction toward the flywheel 3 and the end surfaces 93 of the forks 92, which engage the flat surfaces of the wall portions 94 of the housing 84 will tend to retain and prevent the housing 84 from turning about the axis of the clutch shaft 12.

The forward thrust of the curved surfaces 91 against the surfaces 90 of the housing 84 will move the housing 84 together with the sleeve 51 forwardly which in turn will exert a thrust through the balls 60 to move the outer race member 58 together with the housing 51 forwardly to exert a thrust on the curved end portions 64 of the levers 63 to cause the extension portions 74 of the lever members 63 to exert a thrust through the members 75 against the extension portions 72 to move the clutch plate 44 away from the friction facing 17 and to throw the clutch out relative to driving engagement with the friction members of the disc 18 and which is driven by the flywheel 3, thus releasing the clutch mechanism.

As soon as the thrust is removed or released from the lever or pedal member 114, the retractive spring or resilient member 103 by its connection with the lug 99 of the housing 84 will cause the housing 84, together with the sleeve 51 and the clutch throwout bearing assembly E to return to its normal position, thus causing the clutch throwout yoke 65 to rotate in a reverse direction by the surfaces 90 exerting a force against the curved surfaces 91 of the ends 92 of the clutch throwout yoke 65.

The curved portions 64 of the levers 63 of the clutch mechanism are always maintained in engagement with the flange portion 62 of the outer race member 58 by the resilient members 45.

I claim:

1. In a bearing mechanism, the combination of a sleeve member slidably mounted and provided with a raceway extending circumferentially therearound, said sleeve member being provided with a groove extending circumferentially therearound, said sleeve member being further provided with an annular chamber, an outer race member provided with an annular raceway, members rollably mounted between and engaging the raceways of said sleeve and said outer race members, a housing member mounted on said outer race member and surrounding said sleeve member, a second housing member provided with a bore engaging said sleeve member, said second housing member being provided with a flange portion tightly engaging said groove of said sleeve member, said second housing being provided with a shouldered portion for engaging an end of said sleeve member, said second housing being fixedly secured to said sleeve member to form an integral portion of the bearing mechanism, said second housing member being provided with oppositely disposed boss portions to facilitate operative engagement therewith, said second housing being provided with a lug formed by displacing a portion of the side wall of said second housing and adapted to connect with means adapted to slidably move the bearing mechanism, and a lubricant connection member mounted in said sleeve member and extending through said second housing member, said lubricant connection being connected with said annular chamber of said sleeve member.

2. The combination of a bearing mechanism provided with a race member having a groove extending circumferentially therearound, and a housing member constructed from relatively thin material and having an end edge portion displaced to tightly engage said groove of said race member, to secure said housing member to said race member as an integral portion of said bearing mechanism, said housing member having portions of its walls displaced to form oppositely disposed boss portions each provided with surfaces located in planes extending substantially parallel with and at right angles to the axis of the clutch mechanism, said surfaces of said oppositely disposed boss portions of said housing being adapted to facilitate operative connection with said bearing mechanism.

3. The combination of a bearing mechanism provided with a race member having a groove extending circumferentially therearound, and a housing member constructed from relatively thin material and having one of its end edge portions displaced to tightly engage said groove of said race member, said housing member having the other of its end edge portions displaced to abut an end surface of said race member, said housing member forming, by its connection with said race member, an integral portion of said bearing mechanism, said housing member further having portions of its walls displaced to form boss portions to facilitate operative connection therewith.

4. The combination of a bearing mechanism provided with a race member having an extension portion, and a housing member constructed of relatively thin material fixedly mounted on said extension portion of said race member, to form an integral portion of said bearing mechanism, said housing member having portions of its walls displaced to form boss portions to facilitate operative engagement with said bearing mechanism, said housing member further having a portion of its wall displaced to form a lug to facilitate operative connection therewith.

5. A bearing mechanism slidably mounted and provided with an inner race member having a cylindrical extension portion, said bearing mechanism comprising a housing member fixedly mounted on said extension portion of said inner race member to form an integral portion of said bearing mechanism, said housing member being constructed from sheet material and having portions of its walls displaced to form oppositely disposed boss portions having surfaces extending in a plane located at right angles to the axis of said bearing mechanism and adapted to facilitate operative connection with said bearing mechanism, said boss portions each being provided with surfaces extending in planes located parallel with the axis of said bearing mechanism, said last mentioned surfaces facilitating operative engagement therewith and preventing said housing member and said race member from turning relative to the remaining portions of said bearing mechanism.

6. The combination of a bearing mechanism slidably mounted, and provided with an inner race member provided with a lubricant chamber together with a passage connecting said lubricant chamber with an outside surface of said inner race member, said inner race member being provided with an opening through its side wall and connecting with said lubricant chamber, said bearing mechanism being further provided with a second lubricant chamber surrounding said inner race member and connected with said passage connecting said first mentioned lubricant chamber with the outside surface of said inner race member, a housing member fixedly mounted on said inner race member to form an integral portion of said bearing mechanism and having portions of its walls displaced to form boss portions to facilitate operative engagement with said bearing mechanism, said housing member being provided with an opening through one of its wall portions, said opening being located in alignment with said opening in the side wall of said inner race member, and a lubricant connection member mounted in said opening in the side wall of said housing member and extending within said opening through the side wall of said inner race member, said lubricant connection member being adapted to be engaged by a lubricant gun or similar mechanism.

7. The combination of a bearing mechanism slidably mounted, and provided with a lubricant chamber, said bearing mechanism being further provided with an inner race member having an extension portion, a housing member fixedly mounted on said extension portion of said inner race member to form an integral portion of said bearing mechanism and having portions of its walls displaced to form boss portions adapted to facilitate operative connection with said bearing mechanism, and a lubricant connection member mounted in said housing member and connecting with said lubricant chamber of said bearing mechanism, said lubricant connection member being adapted for connection with a lubricant gun or similar mechanism.

8. The combination of a bearing mechanism slidably mounted and provided with a lubricant chamber, said bearing mechanism being provided with an extended race member, a housing member constructed from sheet material and fixedly mounted on said extended race member of said bearing mechanism, to form an integral portion thereof, said housing member having portions of its walls displaced to form boss portions adapted to facilitate operative engagement therewith, and a lubricant connection mounted on said housing member, and connecting with said lubricant chamber of said bearing mechanism.

9. The combination of a bearing mechanism slidably mounted and provided with a lubricant chamber, said bearing mechanism being provided with an extended race member, a housing member constructed from sheet material and fixedly mounted on said extended race member of said bearing mechanism to form an integral portion thereof, said housing member having portions of its walls displaced to form boss portions adapted to facilitate operative connection therewith, said housing member further having a wall portion displaced to form a lug adapted to facilitate connection with a retractive member, and a lubricant connection mounted on said housing member, and connected with said lubricant chamber of said bearing mechanism.

10. The combination of a bearing mechanism for a clutch mechanism slidably mounted and provided with an extended race member having an outer cylindrical surface adjacent one of its ends, and a housing member provided with a bore for surrounding and engaging said outer cylindrical surface of said extended race member of said bearing mechanism, said housing member being fixedly secured to said extended race member to form an integral portion of said bearing mechanism, said housing member constructed of sheet material and having portions of its walls displaced to form boss portions having wall portions having surfaces extending substantially in planes located at right angles to the axis of the clutch mechanism to facilitate operative engagement therewith, said boss portions of said housing member being further provided with wall portions adjacent an end of said housing member and having surfaces extending in planes located parallel with the axis of the clutch mechanism to further facilitate operative engagement therewith, said housing member further having an end edge portion displaced to form a flange, extending between said boss portions, for engaging an end surface of said extended race member of said bearing mechanism to absorb thrust loads imposed on said boss portions of said housing member when operative engagement is made therewith.

11. The combination of a bearing mechanism for a clutch mechanism slidably mounted and provided with an extended race member having an outer cylindrical surface adjacent one of its ends, and a housing member provided with a bore for surrounding and engaging said outer cylindrical surface of said extended race member of said bearing mechanism, said housing member being fixedly secured to said extended race member to form an integral portion of said bearing mechanism, said housing member being constructed of sheet material and having portions of its walls displaced to form boss portions having wall portions having surfaces extending substantially in planes located at right angles to the axis of the clutch mechanism to facilitate operative engagement therewith to slidably move said bearing mechanism in one direction, said housing member further having a wall portion displaced to form a lug adapted for connection with suitable means for slidably moving said bearing mechanism in an opposite direction, said boss portions of said housing member being further provided with wall portions adjacent an end of said housing member and having surfaces extending in planes located parallel with the axis of the clutch mechanism for engaging said throwout mechanism to further facilitate operative connection therewith, said housing member further having an end edge portion displaced to form a flange, extending between said boss portions, for engaging an end surface of said extended race member of said bearing mechanism to absorb thrust loads imposed on said boss portions of said housing member of said bearing mechanism when operative engagement is made therewith.

12. In a bearing mechanism, the combination of an inner race member having a cylindrical surface constituting a raceway, a plurality of rollably mounted members engaging said raceway, an outer race assembly comprising an outer race member having a raceway engaging said rollably mounted members, said outer race assembly further comprising a housing mounted on said outer race member, said outer race member and said housing being provided with flange portions extending substantially at right angles to the axis of the bearing mechanism and on oppositely disposed sides of said rollably mounted members to provide closure means therefor, and a second housing provided with a bore for mounting on said maximum cylindrical surface of said inner race member, said second housing facilitating operative connection with the bearing mechanism, said second housing being provided with boss portions formed by displacing wall portions of the housing, said housing being provided with oppositely disposed parallel surfaces together with oppositely disposed surfaces extending at right angles to said first mentioned parallel surfaces, said last mentioned oppositely disposed surfaces being extended to form reinforcing surfaces extending substantially at right angles therewith.

13. The combination of a bearing mechanism adapted to operate with a retractive resilient member and provided with a race member having an extension portion, and a housing fixedly mounted on said extension portion, said housing being constructed of relatively thin material having a portion of itself displaced to form a lug adapted for operative connection with said retractive resilient member.

14. In a bearing mechanism, the combination of an outer race member, an inner race member provided with an extended portion having a groove extending circumferentially therearound, rollably mounted members spacing said race members for relative rotation, and a housing member constructed of relatively thin material and mounted on said extended portion of said inner race member, said housing member having oppositely disposed edge portions displaced to respectively engage said groove and an end surface of said inner race member to provide means for absorbing thrust loads imposed on said housing member, said housing member facilitating operative connection with the bearing mechanism.

15. In a bearing mechanism, the combination of an outer race member, an inner race member provided with an extension portion, bearing means spacing said outer and said inner race members to provide relative rotation thereof, and a housing member mounted on the extension portion of said inner race member and provided with boss portions constructed by displacing wall portions of said housing, said boss portions being oppositely disposed on said housing and each provided with thrust surfaces extending at right angles to the axis of the bearing mechanisms together with flattened surfaces extending substantially at right angles to the thrust surfaces of said boss portion, the wall portions of said housing being extended at one of its ends to form a flange portion adjacent each of said last mentioned flattened surfaces, said last mentioned flange portion being located beyond the end of said extension portion of said inner race member, said last mentioned flange portion being displaced throughout a portion of its circumferential length only to engage the outer end surface of said extension of said inner race member to provide for a more rigid mounting of said housing on said inner race member and to absorb thrust loads imposed on said boss portions, said housing being adapted to facilitate operative connection with the bearing mechanism.

THOMAS BARISH.